June 14, 1960 J. DAUGHERTY 2,940,366
POWER OPERATED PENDANT CONTROL STATION
Filed Sept. 5, 1956 5 Sheets-Sheet 1

INVENTOR
JESSE DAUGHERTY
by Carlson, Pitzner, Hubbard & Wolfe
ATTYS.

June 14, 1960     J. DAUGHERTY     2,940,366
POWER OPERATED PENDANT CONTROL STATION
Filed Sept. 5, 1956     5 Sheets-Sheet 2
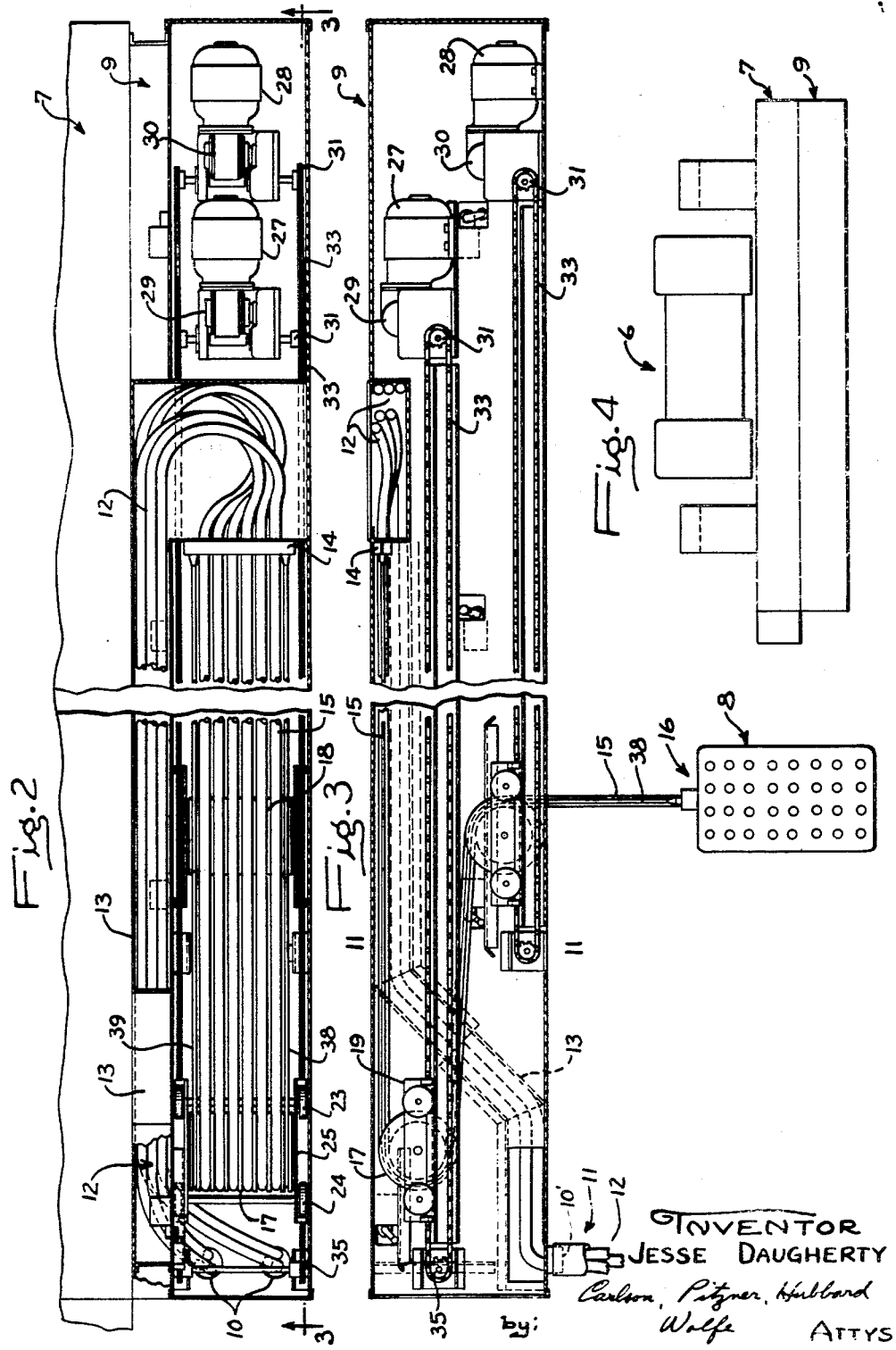
INVENTOR
JESSE DAUGHERTY
by: Carlson, Pitzner, Hubbard Wolfe ATTYS June 14, 1960   J. DAUGHERTY   2,940,366
POWER OPERATED PENDANT CONTROL STATION
Filed Sept. 5, 1956   5 Sheets-Sheet 3
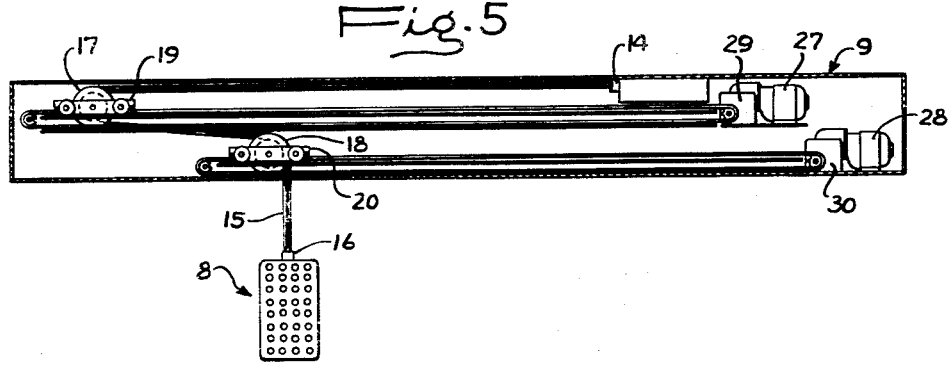
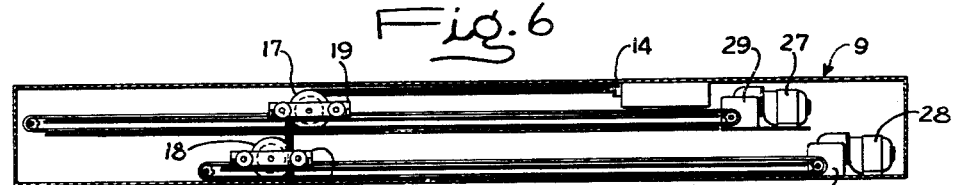
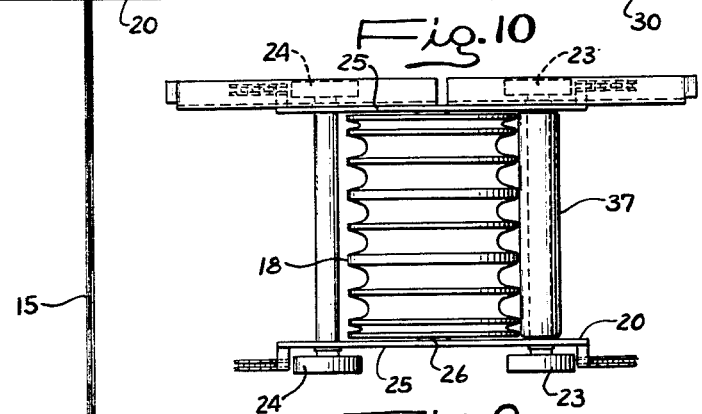
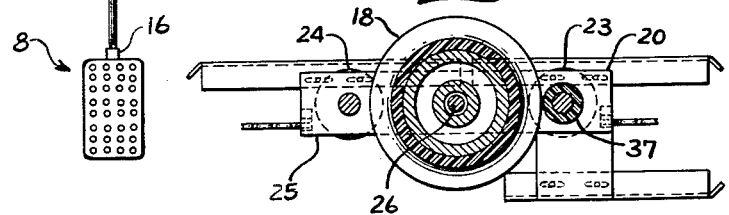
INVENTOR
JESSE DAUGHERTY
by: Carlson, Pitzner, Hubbard & Wolf
ATTYS.

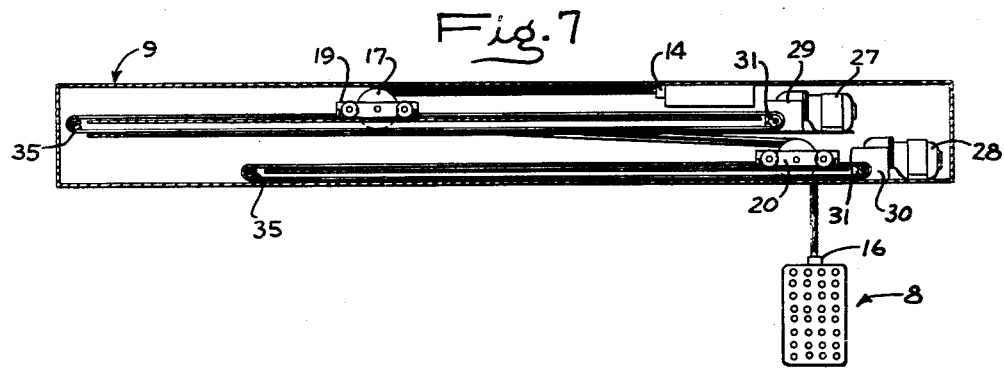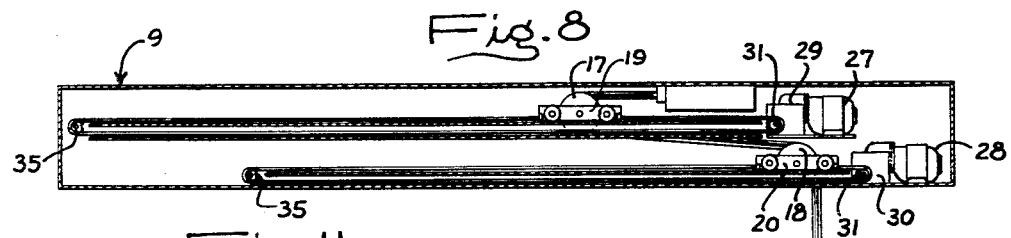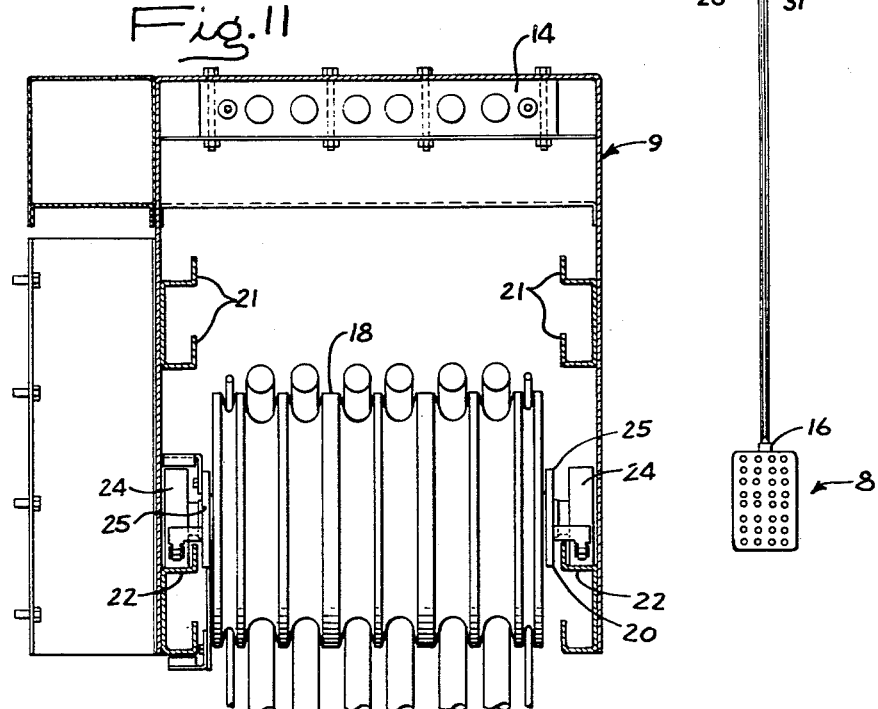

June 14, 1960  J. DAUGHERTY  2,940,366
POWER OPERATED PENDANT CONTROL STATION
Filed Sept. 5, 1956  5 Sheets-Sheet 5

INVENTOR
JESSE DAUGHERTY
by: Carlson, Pitzner, Hubbard & Wolfe
ATTYS.

United States Patent Office 2,940,366
Patented June 14, 1960

2,940,366
POWER OPERATED PENDANT CONTROL STATION

Jesse Daugherty, Fond du Lac, Wis., assignor to Giddings & Lewis Machine Tool Company, Fond du Lac, Wis., a corporation of Wisconsin Filed Sept. 5, 1956, Ser. No. 608,113

3 Claims. (Cl. 90—11)

The present invention relates in general to machine tools. More specifically, the present invention relates to control stations for controlling the various functions and operations of large planer-type machine tools.

In the use of machine tools it is common practice for the operator to station himself at a point from which he may observe closely the working of the cutting tool. Accordingly, a control panel is normally placed near this vantage point so that the functions of the machine may be controlled by the operator with little or no loss of visual contact with the machining operation.

In very large machine tools employing two or more headstocks the operator must often change his position from one spot to the other in order to achieve effective observation. This change in position may involve moving from one side of a machine bed to the other, or mounting a stool or other elevating means. It is, therefore, desirable that the control station be kept at all times within easy reach of the operator despite his changes in position. This is achieved in some instances by anticipating the various positions the operator will take and providing a plurality of control stations, one associated with each anticipated position. Another method used is to mount the control stations on pedestals which in turn may be shifted to various positions on the floor. Sometimes the control station is suspended from a swingable overhead arm. This has the disadvantage of giving only a limited degree of positionability to the control station, and is normally accompanied by the presence of looped or slacked cables which may interfere with the operation of the machine or the work of the operator. Another disadvantage in suspending the control station from an overhead swingable arm is that such control stations are capable of carrying only a limited amount of weight, thereby often resulting in a situation wherein a complete complement of controls cannot be carried by the suspended control station, necessitating the use of one or more additional stationary panels.

One object of the present invention is to provide an adjustably positionable control station organization for machine tools which eliminates the above-mentioned disadvantages.

Another object is to provide an improved machine tool control station including power actuated means by which the station may be positionally adjusted quickly and with a minimum of effort for maintaining it within convenient reach of the operator as he moves from place to place to observe the operations of the tools.

Still another object is to provide a power operated control station organization of the foregoing type in which the adjustable positioning of the station is controlled by push buttons located on a panel carried on the station.

A further object is to provide an adjustably positionable pendulant control station of the above character and having improved means for preventing the cables and other power and control connections with the machine from being twisted or tangled with the elements of the machine.

Other objects and advantages of the invention will become apparent upon reading the attached detailed description and upon reference to the drawings in which:

Fig. 2 is a top view showing the inside of the pendant control station housing.

Fig. 3 is a front view showing the inside of the pendant control station housing.

Fig. 4 is a top view of the machine showing the relative position of the pendant control station housing in respect to the machine support columns.

Fig. 5 is a schematic front view of the pendant control station housing showing the positions of the trolleys when the control station is moved to an extreme left-elevated position.

Fig. 6 is a front schematic view of the pendant control housing showing the positions of the trolleys when the pendant control station is moved to an extreme left-lowered position.

Fig. 7 is a front schematic view of the pendant control housing showing the positions of the trolleys when the control station is moved to an extreme right-elevated position.

Fig. 8 is a front schematic view of the pendant control housing showing the positions of the trolleys when the control station is moved to an extreme right-lowered position.

Fig. 9 is a side elevation of the lower trolley.

Fig. 10 is a top view of the lower trolley.

Fig. 11 is a cross-sectional view of the control housing taken in a vertical plane substantially on the line 11—11 of Fig. 3.

While the invention will be described in connection with the preferred embodiment it would be understood that it is not intended to limit the invention to that particular embodiment, but, on the contrary, it is intended that the invention cover such modifications, alternative constructions and equivalents as may be included within the spirit and scope of the appended claims.

Figure 1:
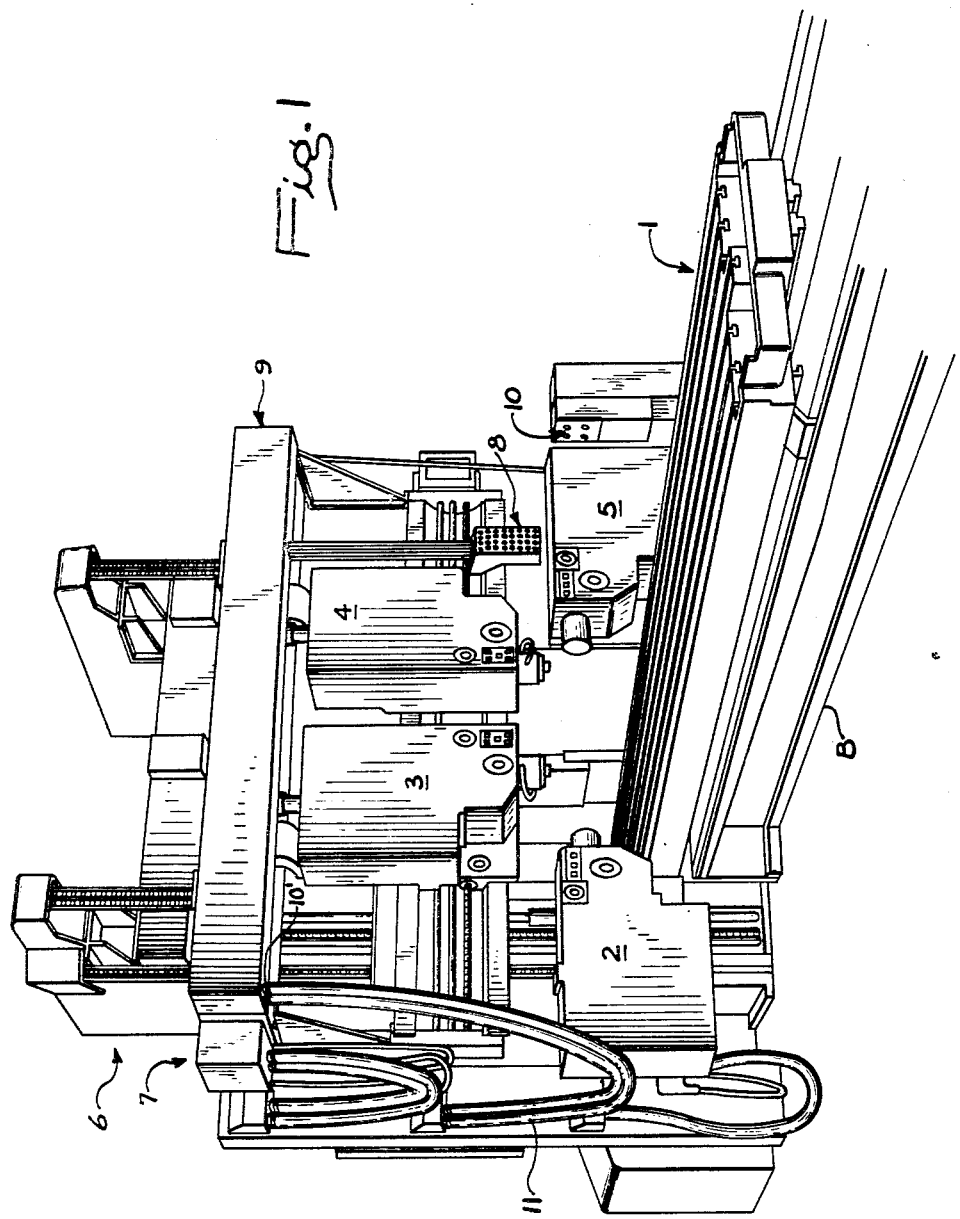
Figure 1 is a front perspective view of a planer-type milling machine employing the present invention.

Turning now to Fig. 1, the invention has been shown as embodied in a planer-type milling machine. This machine has a work support or table 1 supported for reciprocating on horizontally disposed ways on a rigid bed B. In the exemplary machine, four independent headstocks 2–5 are mounted on an arch-shaped support frame 6 straddling the base and bed. Feed and supply lines for the headstock are maintained in a horizontally extended housing 7 above the headstocks.

The movable table 1 serves to hold the work and to feed it into working engagement with the headstock tools. During the operation of the machine the operator may station himself on the right or left side of the bed so as to more closely observe the workings of the right or left headstock respectively, or may mount an elevating means to more closely observe the operation of the two vertical headstocks.

For controlling the operations of the machine, two push button control stations 8 and 10, each having a full set of controlling instrumentalities, are provided. In the exemplary machine, the station 10 is supported on a pedestal at one side of the machine. The station 8, however, is in the form of a pendant panel and, in this instance, is suspended from an overhead housing 9 carried on the support frame 6.

To allow the operator to take up different positions for observing the machine operations and still maintain proper control of the machine, the pendant control station 8 is supported so that it can be adjustably positioned both laterally and vertically to suit the convenience of the operator. The means for positioning the control station 8 are power actuated and are controllable by the operator from either that control station itself or from the control station 10, as desired.

The various elements of the pendant control system are assembled in a compact unit essentially separate from the remainder of the machine and housed in the pendant control housing 9. This housing is a horizontally extended hollow shell having its longitudinal axis disposed transversely to the bed of the machine. As shown in the present embodiment, this housing is a box-like structure attached forwardly of the feed reel housing 7 having at one end suitable connecting means 10′ to which are connected flexible tubes or conduits 11 carrying electric control cables 12. Within the control housing is a structure defining channel 13 (Fig. 3) for guiding these control cables from the connecting means to a rigid connector block 14 located near the top of the housing.

As herein shown, the pendant control station 8 is suspended from the housing 9 by conductor cables 15. Preferably, this control station consists of a box-like structure having a flat forward face on which are mounted the control elements as, for example, push buttons or comparable switches. Suitable connecting means 16 are provided for connecting the conductor cables to the control station. By virtue of the flexibility of the control cables, the control station may be swiveled about a vertical axis if desired by the operator. The conductor cables carry individual electric lines for transmitting the commands of the control elements to the various operating elements of the machine. These conductor cables are fixedly connected at their other end to the connector block 14 within the control housing, establishing an electrical connection with the control cables.

To provide for adjustably positioning the control station 8, the conductor cables 15 by which it is suspended are trained over a pair of sheaves 17 and 18 (Fig. 2) shiftable independently longitudinally of the housing 9. As shown in the drawings, the sheaves are carried by four-wheeled trolleys 19 and 20 riding on superimposed tracks 21 and 22 (Fig. 11) within the housing. The sheaves shown are multigrooved so as to provide a separate groove for each of the conductor cables, and are preferably made from an electric insulating material. The trolleys each comprises a forward pair of wheels 23 and a rear pair of wheels 24 supported by means of two longitudinally extending side pieces 25, as shown in Fig. 9. The sheaves are rotatably carried by means of an axle 26 supported on the side pieces between the front and the rear wheels, as shown in Fig. 10.

Power is supplied to the trolleys 19 and 20 to move them in one direction or the other along the tracks 21 and 22. This may be accomplished by using a stationary power operator and a suitable driving mechanism for drivingly connecting the trolleys to the power operator. In the present instance, each of the movable trolleys has a separate stationary power operator associated with it in the form of a three-phase two-directional motor connected to an irreversible drive speed reducer having an output drive sprocket. As indicated in Figs. 2, 3, 7 and 8, motor 27, speed reducer 29 and output drive sprocket 31 serve as the power operator for the upper trolley 19. By the same token, motor 28, speed reducer 30 and sprocket 31 serve as the power operator for the lower trolley 20.

Drivingly connecting each of the trolleys 19, 20 with its respective power operator is a length of roller-type chain 33 attached at one end to the front of the trolley and attached at its other end to the rear of the trolley. This chain is then stretched over the output drive sprocket of the speed reducer and over an idler sprocket 35 located at the opposite end of the track so as to form an endless loop. The trolley is thus pulled by the chain in one direction or the other along the track upon rotation of the output drive sprocket caused by energization of the motor. The irreversible drive feature of the speed reducer assures that a trolley will maintain its selected position despite any forces caused by the suspended weight tending to move it along the track.

To achieve proper positioning of the suspended control station, the conductor cables are trained over the sheaves as shown in Fig. 3. That is, the conductor cables extend outwardly from the connector block along the top of the housing until they reach the upper sheave 17. They are then trained approximately 180° over the upper sheave, reversing their direction, after which they extend along the middle of the housing until they reach a lower sheave 18. Then they are trained over the lower sheave approximately 90° leaving vertically suspended end portions.

In referring to the drawing, it will be apparent that in order to raise the control station to an extreme left elevated position it is necessary that the upper track extend to the left beyond the lower track so that the upper sheave 17 may take up excess cable sufficient to raise the control station to this position. Figs. 5–8 show the relative positions the two sheaves will assume in order to position the control station in extreme left-elevated, left-lowered, right-elevated, and right-lowered positions respectively.

Upon more specific reference to Figs. 5–8, it will be noticed that in the normal operation of the control station system it will never be necessary to move the upper sheave to the right beyond the lower sheave so as to cause the conductor cables to be pulled from their grooves in the lower sheave. But, it is possible that this could happen through inadvertence on the part of the operator. To guard against this contingency it is desirable that some restraining means be provided to hold the conductor cables in the grooves of the lower sheave despite any overrun of the upper sheave. In the present instance, a solid roller 37 (Fig. 10) made of insulating material is carried by the front axle of the lower trolley, and is of such a size that its surface will lie in close proximity to the sheave so that cables passing through the gap between the sheave and the roller will be restrained within their respective grooves.

To remove the weight-bearing function from the conductor cables there may be provided separate weight supporting means. These separate weight-supporting means may consist of flexible tension members connected to the connecting block 14 at one of their ends and to the control station 8 at the other of their ends, and trained over the two sheaves along with the conductor cables. In the present embodiment these flexible tension members are shown as being two steel cables 38 and 39 straddling and in alinement with the conductor cables. These two steel cables are slightly shorter than the conductor cables, and because of this will carry the entire weight of the suspended control station.

To selectively adjust the position of the pendant control station there is provided suitable means for controlling the power actuators. Preferably, two separate sets of controls are provided; first, one at the suspended control station 8 itself, and second, one mounted stationary at some freely accessible spot as, for example, at the pedestal control station 10. The type of control means used will, of course, depend on the type of power means used for actuating the system. Since, in the present instance, electrically driven power means are shown, a complementary electric control circuit has likewise been indicated.

Figure 12:
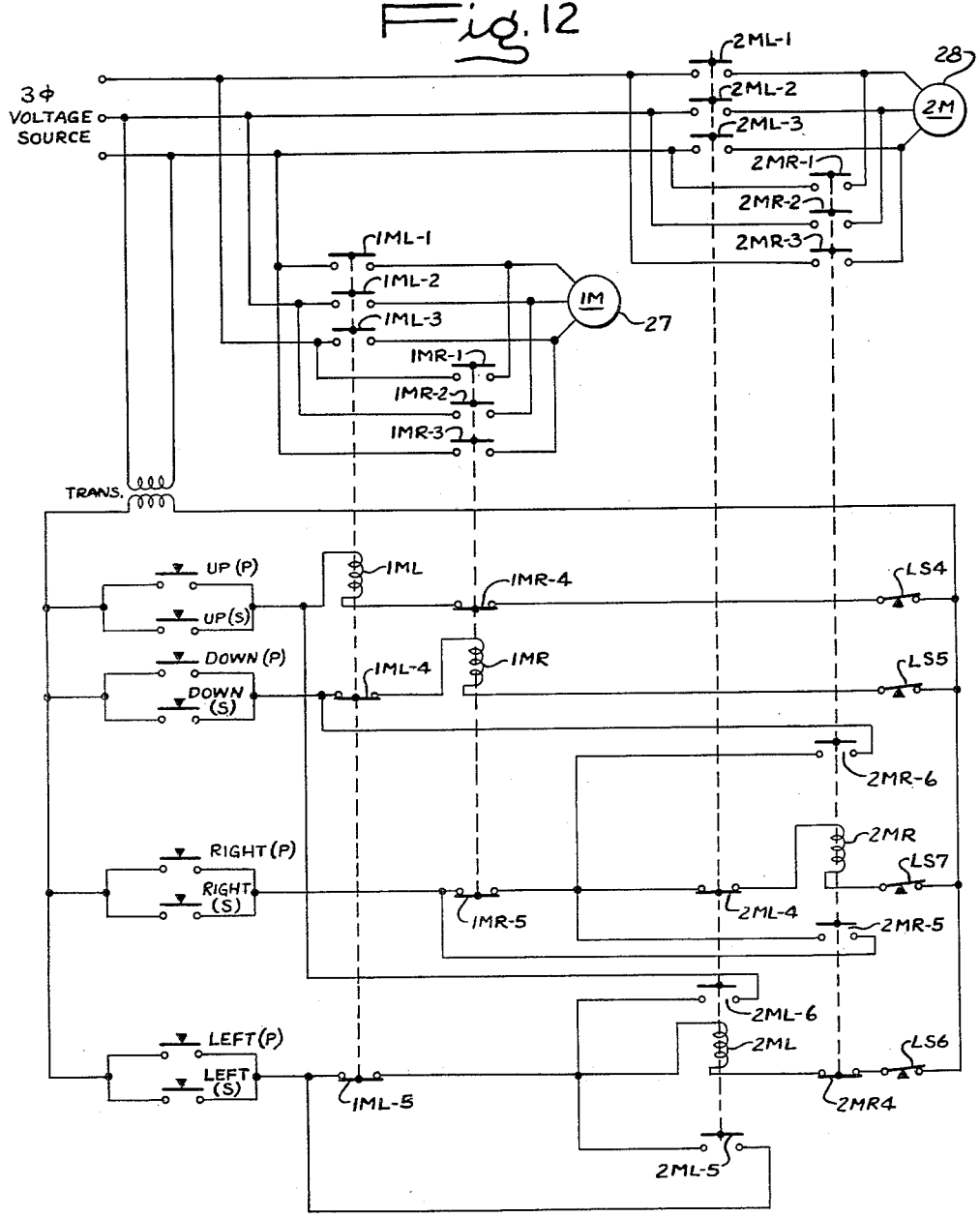
Fig. 12 is a wiring diagram showing the control circuit for positioning the control station.

Referring specifically to Fig. 12, there is shown push buttons for controlling the operations of the motors. Each push button has in parallel with it a functionally similar push button so that one may be mounted on the control station 8 and the other on the stationary control station 10. Depressing either one of the Up buttons energizes the relay 1ML through a limit switch LS4 and a normally closed contact 1MR-4. Energization of a 1ML relay closes the motor contacts 1ML-1, 1ML-2 and 1ML-3, thereby activating the upper motor and causing it to move the upper sheave towards the left and raise the control station. Excessive movement of the sheave toward the left is prevented by the limit switch LS4 which is opened by the trolley when moved to an extreme left position. Energization of the 1ML relay also opens the normally closed contacts 1ML-4 and 1ML-5. The 1ML-4 contact provides a safety interlock feature preventing inadvertent shorting of the electric circuit by pressing the Down button while the Up button is being pressed. The contact 1ML-5 provides a safety interlock preventing the possible short circuit which would otherwise occur by pressing a Left button while the Up button is being pressed.

Pressing the Down button completes a circuit through limit switch LS5 and normally closed contact 1ML-4 to the relay 1MR. Energization of the 1MR relay closes the motor contacts 1MR-1, 1MR-2 and 1MR-3 causing the upper motor to move the upper trolley towards the right and lower the control station. Energization of this relay also opens normally closed contacts 1MR-4 and 1MR-5 providing a safety interlock guarding against possible short circuiting caused by pushing either one of the Up buttons or one of the Right buttons while a Down button is being pushed. Overrun of the upper trolley while moving to the right is prevented by limit switch LS5 which breaks the circuit when the upper trolley is moved to an extreme right position.

Pressing a Right button completes a circuit through normally closed contacts 1MR-5, 1MR-4 and limit switch LS7 to the relay 2MR. Energization of the 2MR relay closes the motor contacts 2MR-1, 2MR-2 and 2MR-3 causing the lower motor to move its trolley towards the right. Energization of the 2MR relay also closes the normally open contact 2MR-6 which completes a circuit to the 1MR relay causing the upper trolley to move to the right as described above. Thus, pressing a Right button causes the lower and the upper sheaves to move together towards the right. In the present embodiment it is preferable that the lower sheave be moved to the right along its track at double the speed the upper sheave is moved. This may easily be accomplished by proper selection of speed reducers. It will readily be seen by reference to Figs. 5-8 that if the lower trolley is made to move at twice the speed of the upper trolley the control station will be shifted to the right without any change in its elevation. Energization of the 2MR relay also opens normally closed contact 2MR-4 and closes normally open contact 2MR-5. Contact 2MR-4 provides a safety interlock preventing short-circuiting by pushing a Left button while a Right button is being pressed. Contact 2MR-5 is placed in parallel with contact 1MR-5 and is used to maintain a circuit through the 1MR relay despite opening of the 1MR-5 contact by the 1MR relay. Extreme right movement of the lower trolley is limited by limit switch LS-7.

Pressing a Left button energizes the 2ML relay through the normally closed contacts 1ML-5 and 1MR-4 and limit switch LS6. Energization of the 2ML relay closes the motor contacts 2ML-1, 2ML-2 and 2ML-3, activating the lower motor and causing it to move the lower trolley to the left. The 2ML-5 and the 2ML-6 contacts are also closed by the 2ML relay completing a circuit to the 1ML relay causing the upper trolley to be moved to the left as described above. Both trolleys are thereby moved simultaneously causing the control station to move to the left without any change in elevation, provided the lower trolley travels at twice the speed of the upper trolley. Extreme left movement of the lower trolley is prevented by limit switch LS6. Normally closed contact 2ML-4 opened by energization of the 2ML relay provides a safety interlock preventing short-circuiting by pushing the Right button while the Left button is being pushed.

Thus, the operator will be able to position the control panel to suit his convenience without the use of great manual effort by simply operating the position control buttons. Changing the position of the control station by pressing the control buttons on the pendant control station itself requires that the operator be able to bodily follow the movement of that control station and to hold down the control button. If this is not practical, he may control the positioning from a parallel set of controls mounted at the stationary control station 10.

I claim as my invention:

1. A pendant control station for use in a control system for a large machine tool including a worktable and a horizontal support structure suspended thereabove, said control station comprising, in combination, a control panel, a support housing for said control panel secured to the horizontal support structure, means on said housing defining upper and lower superimposed horizontal tracks substantially coextensive with the length of said housing, a trolley supported on each of said tracks for horizontal traversing movement therealong, independent power actuated means mounted within said housing and operatively connected to said trolleys for translating the same on said tracks, said power means including electric motors drivingly connected to said trolleys through irreversible speed reducers, a sheave rotatably supported on each trolley, and flexible tension elements rigidly anchored at one end to said housing and at their other end to said control panel, said elements being supported intermediate their ends by said sheaves and running over opposite vertical sides thereof, said trolleys being horizontally translatable independently on their associated tracks to selectively position the control station both vertically and horizontally with respect to the machine tool worktable.

2. A pendant control station assembly for use in connection with large machine tools having a worktable translatable on a bed, said station comprising, in combination, an overhead horizontally extended housing disposed transverse to the movement of the worktable, equal lengths of alined spaced-apart cables each having one end anchored near an inside top corner of said housing and having a free end dependent from said housing, a control station attached to the free ends of said cables, two substantially horizontal tracks disposed one above the other within and substantially traversing the length of said housing, two movable sheaves each adapted to ride on respective ones of said tracks for horizontal movement therealong and cooperating with said cables so as to adjust the length of the free dependent end and therewith the vertical position of the control station upon horizontal movement of said sheaves relative to each other and said housing, and to position said free dependent end and attached control station laterally with respect to said housing upon horizontal movement of both of the sheaves in one direction or the other along said tracks within said housing.

3. A pendant control station assembly for use in connection with large machine tools having a worktable translatable on a bed, said station comprising, in combination, an overhead horizontally extended housing fixed to the machine and disposed transverse to the movement of the worktable, superimposed spaced apart horizontal rails placed longitudinally within said housing defining upper and lower horizontal tracks parallel to each other and each traversing a substantial portion of the housing length, two trolleys each running on respective ones of said tracks and each having front and rear axles carrying spaced apart wheels adapted to ride on and carry said trolley between said spaced apart tracks for horizontal traversing movement therealong, a flexible drive element attached to each trolley for drawing it in either direction along said tracks, two separate driving means each associated with a respective one of said tracks and each consisting of a two-directional electric motor and an irreversible drive speed reducer drivingly connected to said flexible drive element, multigrooved sheaves carried by said trolleys rotatable about longitudinal axes disposed transversely to said tracks, a connector block located near the inside top and one end of said housing, a plurality of alined spaced-apart cables attached at one of their ends to said connector blocks and trained together over first the upper sheave and then over the lower sheave leaving a downwardly depending end portion suspended from said housing, and a control station attached to the suspended ends of said cables, said control station being positionable vertically by moving said upper trolley backwards or forwards along its track thereby shortening or lengthening respectively the amount of cable depending from the housing, and positionable laterally by moving the lower trolley backwards or forwards along its tracks while at the same time moving the upper trolley in the same direction but over only one half the distance covered by the lower trolley.

References Cited in the file of this patent

UNITED STATES PATENTS

| | | |
|---|---|---|
| 2,177,941 | Knudson et al. | Oct. 31, 1939 |
| 2,201,954 | Flygare | May 21, 1940 |
| 2,315,301 | Van Deventer et al. | Mar. 30, 1943 |

FOREIGN PATENTS

| | | |
|---|---|---|
| 1,004,368 | France | Nov. 28, 1951 |
| 1,065,551 | France | Jan. 13, 1954 |